United States Patent [19]
Murray

[11] Patent Number: 4,817,143
[45] Date of Patent: Mar. 28, 1989

[54] SCRAMBLED SIGNAL RECEIVER

[75] Inventor: Bruce Murray, Wokingham, United Kingdom

[73] Assignee: U.S. Philips Corporation, New York, N.Y.

[21] Appl. No.: 934,780

[22] Filed: Nov. 25, 1986

[30] Foreign Application Priority Data

Nov. 25, 1985 [GB] United Kingdom ............... 8529004

[51] Int. Cl.$^4$ ............................................. H04L 9/04
[52] U.S. Cl. ......................................... 380/20; 380/21
[58] Field of Search ...................... 380/10, 13, 20, 21

[56] References Cited

U.S. PATENT DOCUMENTS

| | | | |
|---|---|---|---|
| 4,322,745 | 3/1982 | Saeki et al. | 380/20 |
| 4,475,123 | 10/1984 | Dumbauld et al. | 380/13 |
| 4,484,027 | 11/1984 | Lee et al. | 380/21 |
| 4,531,021 | 7/1985 | Bluestein et al. | 380/21 |
| 4,600,942 | 7/1986 | Field et al. | 380/21 |
| 4,613,901 | 9/1986 | Gilhousen et al. | 380/21 |
| 4,635,113 | 1/1987 | Okada et al. | 380/20 |
| 4,636,851 | 1/1987 | Brury et al. | 380/20 |
| 4,646,147 | 2/1987 | Kruger | 380/20 |
| 4,682,360 | 7/1987 | Fredriksen | 380/20 |
| 4,691,352 | 9/1987 | Arrugon et al. | 380/20 |
| 4,694,491 | 9/1987 | Horne et al. | 380/21 |
| 4,723,283 | 2/1988 | Nasagawa et al. | 380/21 |
| 4,731,840 | 3/1988 | Mniszewski et al. | 380/21 |
| 4,736,422 | 4/1988 | Mason | 380/21 |

Primary Examiner—Salvatore Cangialosi
Attorney, Agent, or Firm—Gregory P. Gadson; Leroy Eason

[57] ABSTRACT

A system including a receiver which receives scrambled signals and subjects them to a descrambling process under the control of control words periodically conveyed to the receiver by a conditional access subsystem. A new control word is required for every 256 television frames constituting a descrambling period, which control word is transmitted during the preceding descrambling period. In order to reduce the time taken to initiate the descrambling process upon selection of a particular service or following an interruption therein, the initial control word then conveyed to the receiver is that for the 256 frame descrambling period following the existing descrambling period. The initial control word is followed by the control word for the existing descrambling period. Subsequent control words are successively conveyed to the receiver during the descrambling intervals preceding those to which such control words are respectively applicable.

2 Claims, 2 Drawing Sheets

SCRAMBLED SIGNAL RECEIVER

BACKGROUND OF THE INVENTION

The present invention relates to a receiver for the reception of scrambled signals, which signals are to be subjected to a descrambling process under the control of control words conveyed from a conditional access sub-system coupled to said receiver, said control words being produced in response to data conveyed from said receiver to said sub-system, a fresh control word being required at intervals for performing the descrambling process during a given period.

In the evolution of the specifications for MAC-packet television transmission systems which are currently represented by the European Broadcasting Union documents "Television Standards for the Broadcasting Satellite Service—Specification of the C-MAC/Packet System"—SPB 284, 3rd revised version published December 1984 and "Methods of Conveying C-MAC/Packet Signals in Small and Large Community Antenna and Cable Network Installations"—SPB 352 published December 1984, which documents are incorporated herein by way of reference, the requirement to scramble vision, sound and data services for conditional access purposes was identified as an important requirement at an early stage. For this reason, all members of the MAC-packet family permit the generation of the control words required for descrambling in response to data received by the receiver. With the MAC-packet family, a new control word is required at intervals of 256 television frames for generating the data needed to provide the descrambling process in the receiver during a given period of 256 television frames. Obviously, the control word required for a given period needs to be received from the sub-system prior to the start of the given period and while this is perfectly satisfactory during the reception of a service, problems may be encountered upon selecting a service (such as at switch on), or if there should be an interruption of the service. This could result in a scrambled signal not being descrambled for an entire descrambling period of approximately 10 seconds (256 frames at 25 frames per second).

SUMMARY OF THE INVENTION

It is an object of the invention to overcome the above problem.

The invention provides a receiver for the reception of scrambled signals, which signals are to be subjected to a descrambling process under the control of control words conveyed from a conditional access sub-system coupled to said receiver, said control words being produced in response to data conveyed from said receiver to said sub-system, a fresh control word being required at intervals for performing the descrambling process during a given period, characterized in that following selection of a particular receiver service or an interruption therein, the control word initially conveyed from said sub-system to said receiver is that for the descrambling period immediately following that in which such initial control word is conveyed, which initial control word is followed by the control word for the current descrambling period, further control words thereafter conveyed from the sub-system to the receiver being those required for the descrambling periods immediately following those in which the further control words are conveyed.

Such a receiver ensures that any delay in initiating the descrambling process is kept to a minimum.

Each given period may be 256 times the television frame period of a television signal received by the receiver, the information conveyed between the receiver and the sub-system occuring in cycle periods of four television frame periods, the initial and the following control words being conveyed in adjacent cycle periods. Such periods are relevant to signals of the MAC-packet family.

BRIEF DESCRIPTION OF THE DRAWINGS

The above and other features will now be described, by way of example, with reference to the accompanying drawings in which.

DETAILED DESCRIPTION OF THE INVENTION

Figure 1:
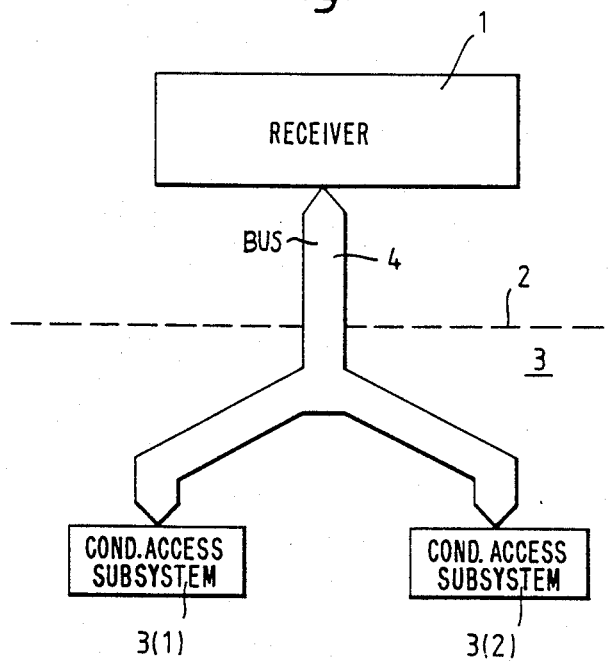
FIG. 1 is a block diagram of a receiver and sub-system for use with the invention.

FIG. 1 is a block diagram showing the connection between a receiver and conditional access sub-systems which may be internal with or external to the receiver. The reference 1 indicates the receiver with its associated signal decoders, and which may be suitable for the reception of one or more forms of the MAC-packet family as specified in the EBU documents SPB 284 and SPB 352 referred to above. The receiver 1 will then include the hardware necessary to demultiplex entitlement message packets as specified in part 5 of the above EBU documents as well as descrambling the received signals (video and sound/data). The broken line 2 indicates the boundary between the receiver 1 and a conditional access sub-system(s) 3 which although physically separated from each other may be accommodated in the television receiver or external thereto.

The receiver 1 and conditional access sub-system(s) 3 are interconnected by way of an interface bus 4. The CA sub-system(s) contain the customer address, the software for decoding the over-air data and the decryption algorithms and provide the control words for the receiver for the descrambling process. For television receivers required to decode separately encrypted services simultaneously, a number of sets of conditional access sub-systems and consequently interfaces will be required. FIG. 1 shows two such CA sub-systems 3(1) and 3(2) connected to a common interface.

Figure 2:
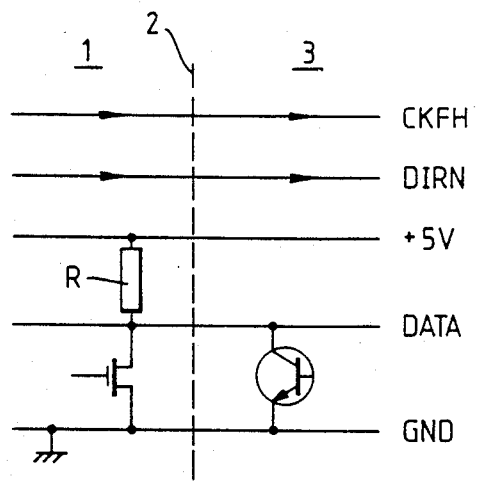
FIG. 2 is a diagram of a bus for use with the arrangement of FIG. 1.

FIG. 2 shows a suitable construction containing five lines for the bus 4 of FIG. 1. The reference 2 again indicates the boundary between the receiver 1 and the CA sub-system(s) 3. The five lines are as follows:

CKFH—conveys line frequency (15.625 kHz) clock pulses positive edges of which synchronize data transitions. Compatible with TTL.

DIRN—indicates the direction of transmission on the DATA line. When 'high' denotes receiver is transmitting, 'low' denotes CA sub-system is transmitting. Transitions synchronized to the positive edges of CKFH. Compatible with TTL.

+5V—conveys +5 volts for energizing CA sub-system.

DATA—bi-directional data line (open drain/collector input/output). Compatible with TTL. For pullup, resistor R is placed on receiver side at interface boundary. Data as seen at interface should be logically 'true'.

GND—line at ground or earth potential.

Figure 3:
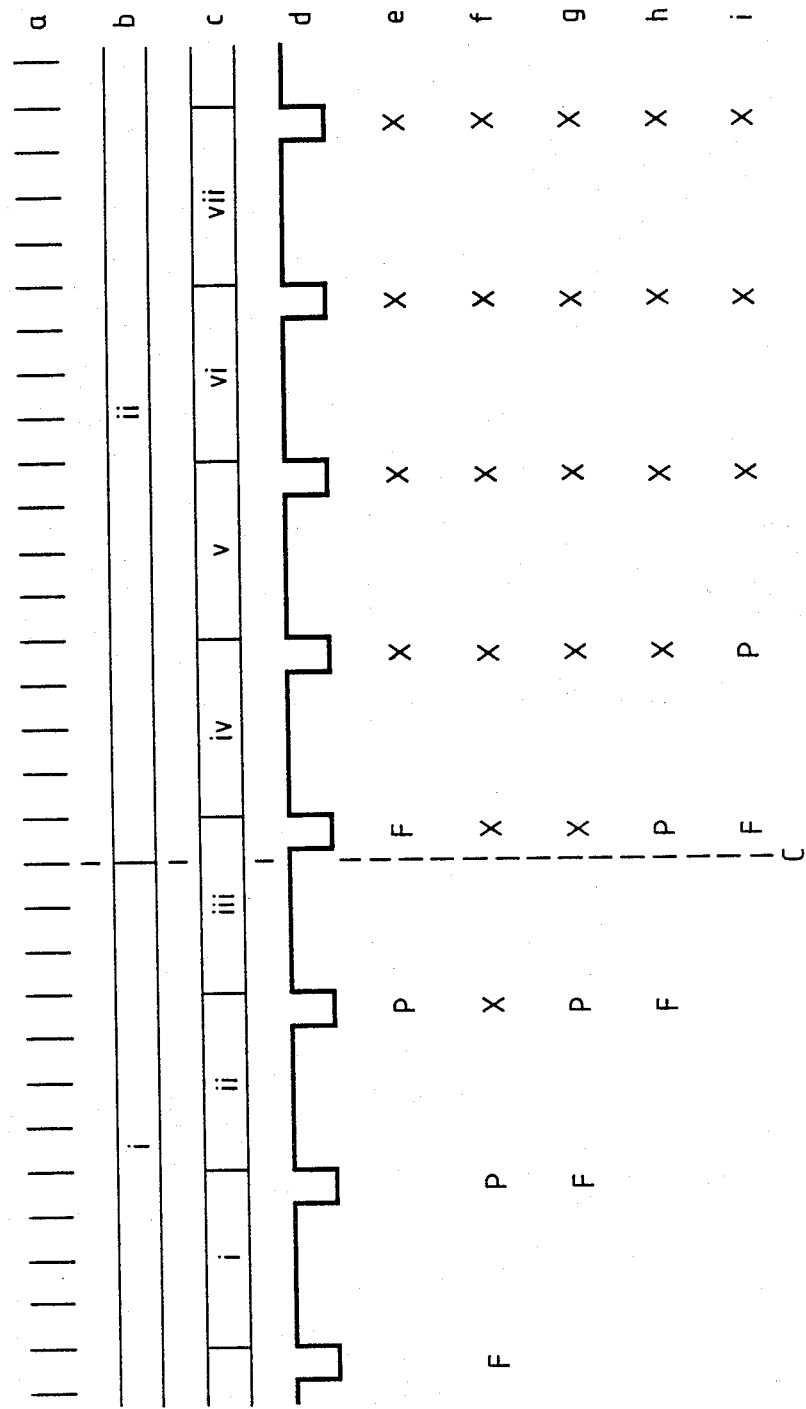
FIG. 3 shows signal and timing diagrams for the bus of FIG. 2.

FIG. 3 shows the DATA and the DIRN signals conveyed by the bus 4, together with frame and control word information. The periods indicated between the vertical lines in FIG. 3a are television frame periods each of 40 m secs. In FIG. 3b the division at the frame indicated by the broken line C is the boundary between old (i) and new (ii) control words in use in the receiver for the descrambling process and produced in the sub-system, these control words being changed every 256 frames. The blocks of data transmitted over the DATA line of the bus of FIG. 2 is shown in FIG. 3c which blocks are sequentially numbered i to vii, FIG. 3c showing that this data is transmitted in equal data periods, each of which is the length of four television frame periods. FIG. 3d shows the direction of transmission signal DIRN (seen in the bus of FIG. 2) which is 'high∞ for the greater part of each data block period of FIG. 3c during which data passes from the receiver to the CA sub-system and 'low' for the lesser part of each data block period during which data passes from the CA sub-system to the receiver.

During some of the periods of transmission from the sub-system to the receiver, control words are conveyed to the receiver for the descrambling process. With a receiver operating with a particular service selected, each control word conveyed to the receiver is transmitted in the 256 frame descrambling period prior to the descrambling period in which it is required for use. Thus, the control word to be used by the receiver during period ii in FIG. 3b is conveyed from the sub-system to the receiver in or prior to data block ii of FIG. 3c. However, at switch on, or at a channel change, or in the case of an interruption to a service, it is necessary to get the currently required control word to the receiver as soon as possible. In certain circumstances, this can cause a break in the descrambling process for a full descrambling period of 256 frames (about 10 seconds), which is unacceptable. Such a circumstance is illustrated in FIG. 3e where P indicates the presence of the control word for the present or current 256 frame descrambling period, F indicates the presence of the control word for the following 256 frame descrambling period and X indicates places where the F control word may be transmitted. If the P control word is transmitted during data block ii of FIG. 3c, then it will render the descrambling process operative for the remaining part of the 256 frame descrambling period i of FIG. 3b. However, the subsequent transmission of the F control word in data block iii of FIG. 3c will not render the descrambling process operative during the next 256 frame descrambling period ii of FIG. 3b, as this control word is transmitted during descrambling period ii and so relates to the 256 frame period descrambling period following the descrambling period ii of FIG. 3b. Thus, if the receiver is switched on during data block ii descrambling is not effected during period ii, which is about 10 seconds.

Applicants have realized that the above problem can be overcome if in all cases at switch on, channel change or interruption, the control word F for the following 256 frame descrambling period is always transmitted before the control word P for the present 256 frame descrambling period and FIGS. 3f, 3g, 3h and 3i illustrate several instances showing this, the references P, F and X having the same meaning as with FIG. 3e. In FIGS. 3 to 3i, the first control word F transmitted is the control word required for the 256 frame period ii in FIG. 3b, while in FIGS. 3f and 3g the second control word P is the control word required for the 256 frame period i in FIG. 3b. In FIG. 3h (and in FIG. 3i for that matter), the second control word P is for the 256 frame period ii in FIG. 3b. In FIG. 3i, the first second control word F is for the 256 frame period following period ii in FIG. 3b. The control words shown as X need not be conveyed to the receiver in every data block, and once the descrambling is operational, the control word X need only be conveyed to the receiver once every 256 frame descrambling period. Preferably, however, the first (F) and second (P) control words are conveyed in adjacent data blocks.

With control words conveyed to the receiver in the described manner, the delay in starting the descrambling process is at most one data block period, corresponding to four television frame periods (160 m seconds).

I claim:

1. A system for receiving scrambled signals of a selected information service, such system comprising a receiver for subjecting said signals to a descrambling process under control of successive control words transmitted to said receiver by a conditional access sub-system; said sub-system producing such control words in response to data transmitted thereto by said receiver, such control words being produced at intervals for controlling the descrambling process in said receiver during successive descrambling periods which respectively correspond to the respective control words; characterized in that said subsystem is adapted to transmit to said receiver, following selection of said information service or resumption of an interruption therein, an initial control word which is applicable to the descrambling period following that during which such initial control word is transmitted, such initial control word being succeeded by the control word which is applicable to the descrambling period during which said initial control word was transmitted; said subsystem thereafter successively transmitting further control words to said receiver which are respectively applicable to the respective descrambling periods succeeding those during which such further control words are respectively transmitted.

2. A receiving system as claimed in claim 1, in which each descrambling period comprises a plurality of television frames of a scrambled television signal received by said receiver; further characterized in that information is transmitted between the receiver and the sub-system in successive data block during each descrambling period, said initial control word and said succeeding and further control words being transmitted from the sub-system to the receiver in respective adjacent data blocks.

* * * * *